(12) United States Patent
Sah et al.

(10) Patent No.: US 12,550,096 B2
(45) Date of Patent: Feb. 10, 2026

(54) ROHC OPTIMIZATION TO AVOID DECOMPRESSION FAILURE

(71) Applicant: QUALCOMM Incorporated, San Diego, CA (US)

(72) Inventors: Deepak Sah, Hyderabad (IN); Rahul Jain, Sawai Madhopur (IN); Nagamanikandan Sivakumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 18/288,594

(22) PCT Filed: May 3, 2022

(86) PCT No.: PCT/US2022/072082
§ 371 (c)(1),
(2) Date: Oct. 27, 2023

(87) PCT Pub. No.: WO2022/272197
PCT Pub. Date: Dec. 29, 2022

(65) Prior Publication Data
US 2024/0214962 A1    Jun. 27, 2024

(30) Foreign Application Priority Data

Jun. 25, 2021   (IN) .............................. 202141028600

(51) Int. Cl.
*H04W 60/04*    (2009.01)
*H04W 28/06*    (2009.01)
(Continued)

(52) U.S. Cl.
CPC .......... *H04W 60/04* (2013.01); *H04W 28/06* (2013.01); *H04W 60/06* (2013.01); *H04W 76/20* (2018.02)

(58) Field of Classification Search
CPC ..... H04W 60/04; H04W 28/06; H04W 60/06; H04W 76/20; H04L 69/22; H04L 69/04
See application file for complete search history.

(56) References Cited

U.S. PATENT DOCUMENTS

2018/0014225 A1*  1/2018  Yang ................. H04W 28/0215
2018/0242192 A1*  8/2018  Zhao ..................... H04W 80/00
(Continued)

OTHER PUBLICATIONS

International Search Report and Written Opinion—PCT/US2022/072082—ISA/EPO—Jul. 20, 2022.
(Continued)

*Primary Examiner* — Jae Y Lee
(74) *Attorney, Agent, or Firm* — QUALCOMM IP DEPT.; James Hunt Yancey, Jr.

(57) ABSTRACT

A transmitter device may be configured to perform to robust header compression optimization to improve channel throughput. In some aspects, the transmitter device may establish a first base context between the transmitter device and a receiver device, wherein a first context identifier is assigned to the first base context, establish a replication context between the devices, wherein the replication context is derivable from the first base context and a second context identifier is assigned to the replication context, and identify a new context. Further, the transmitter device may reassign the first context identifier to the new context, disassociate the second context identifier from the first context identifier, establish a second base context between the devices, wherein a third context identifier is assigned to the second base context, and associate, based on the replication context being derivable from the second base context, the second context identifier to the third context identifier.

30 Claims, 7 Drawing Sheets

(51) Int. Cl.
 *H04W 60/06* (2009.01)
 *H04W 76/20* (2018.01)

(56) References Cited

U.S. PATENT DOCUMENTS

2019/0297019 A1* 9/2019 Mudireddy ........ H04W 28/0273
2020/0275311 A1* 8/2020 Zhao ..................... H04W 28/06

OTHER PUBLICATIONS

Jonsson L-E., et al., "Robust Header Compression (ROHC) : Corrections and Clarifications to RFC 3095, draft-ietf-rohc-rtp-impl-guide-19.txt", Robust Header Compression (ROHC): Corrections and Clarifications to RFC 3095, DRAFT-IETF--ROHC-RTP-IMPL-GUIDE-19.TXT, Internet Engineering Task Force, IETF, Standardworkingdraft, Internet Society (ISOC) 4, Rue Des Falaises CH-1205, Geneva, Switzerland, vol. rohc, No. 19, May 22, 2006, 29 Pages, XP015045159.

Moderator (LG Electronics): "Summary #2 on Maintenance of Other Aspects for URLLC/IIOT", 3GPP Draft, 3GPP TSG RAN WG1 #100bis, R1-2002721, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020, Apr. 18, 2020 (Apr. 18, 2020), XP051876676, 31 Pages, Section 3.2.1, Sections 1-6.

\* cited by examiner

ROHC OPTIMIZATION TO AVOID DECOMPRESSION FAILURE

CROSS REFERENCE TO RELATED APPLICATION(S)

This application is a 35 U.S.C. § 371 National Phase of International Patent Application No. PCT/US2022/072082, entitled "ROHC OPTIMIZATION TO AVOID DECOMPRESSION FAILURE," and filed on May 3, 2022, which claims priority to Indian Patent Application number 202141028600, entitled "ROHC OPTIMIZATION TO AVOID DECOMPRESSION FAILURE," and filed on Jun. 25, 2021, the disclosures of which are expressly incorporated by reference herein in their entireties.

BACKGROUND

Technical Field

The present disclosure relates generally to wireless communication, and more particularly, to optimizing robust header compression (ROHC) to improve channel throughput.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IOT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a transmitter device comprising establishing, with a receiver device, a first base context for first communications between the transmitter device and a receiver device, wherein a first context identifier is assigned to the first base context, establishing, with the receiver device, a replication context for second communications between the transmitter device and the receiver device, the replication context derivable from the first base context and a second context identifier assigned to the replication context, identifying a new context based on a first packet, reassigning, in response to identifying the new context, the first context identifier to the new context, disassociating the second context identifier from the first context identifier based on the reassigning of the first context identifier, establishing, with the receiver device, a second base context for third communications between the transmitter device and the receiver device, a third context identifier assigned to the second base context, and associating, based on the replication context being derivable from the second base context, the second context identifier to the third context identifier.

The disclosure also provides an apparatus (e.g., a transmitter device) including a memory storing computer-executable instructions and at least one processor configured to execute the computer-executable instructions to establish, with a receiver device, a first base context for first communications between the transmitter device and a receiver device, wherein a first context identifier is assigned to the first base context, establish, with the receiver device, a replication context for second communications between the transmitter device and the receiver device, the replication context derivable from the first base context and a second context identifier assigned to the replication context, identify a new context based on a first packet, reassign, in response to identifying the new context, the first context identifier to the new context, disassociate the second context identifier from the first context identifier based on the reassigning of the first context identifier, establish, with the receiver device, a second base context for third communications between the transmitter device and the receiver device, a third context identifier assigned to the second base context, and associate, based on the replication context being derivable from the second base context, the second context identifier to the third context identifier. In addition, the disclosure also provides an apparatus including means for performing the above method, and a computer-readable medium (e.g., a non-transitory computer-readable medium) storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
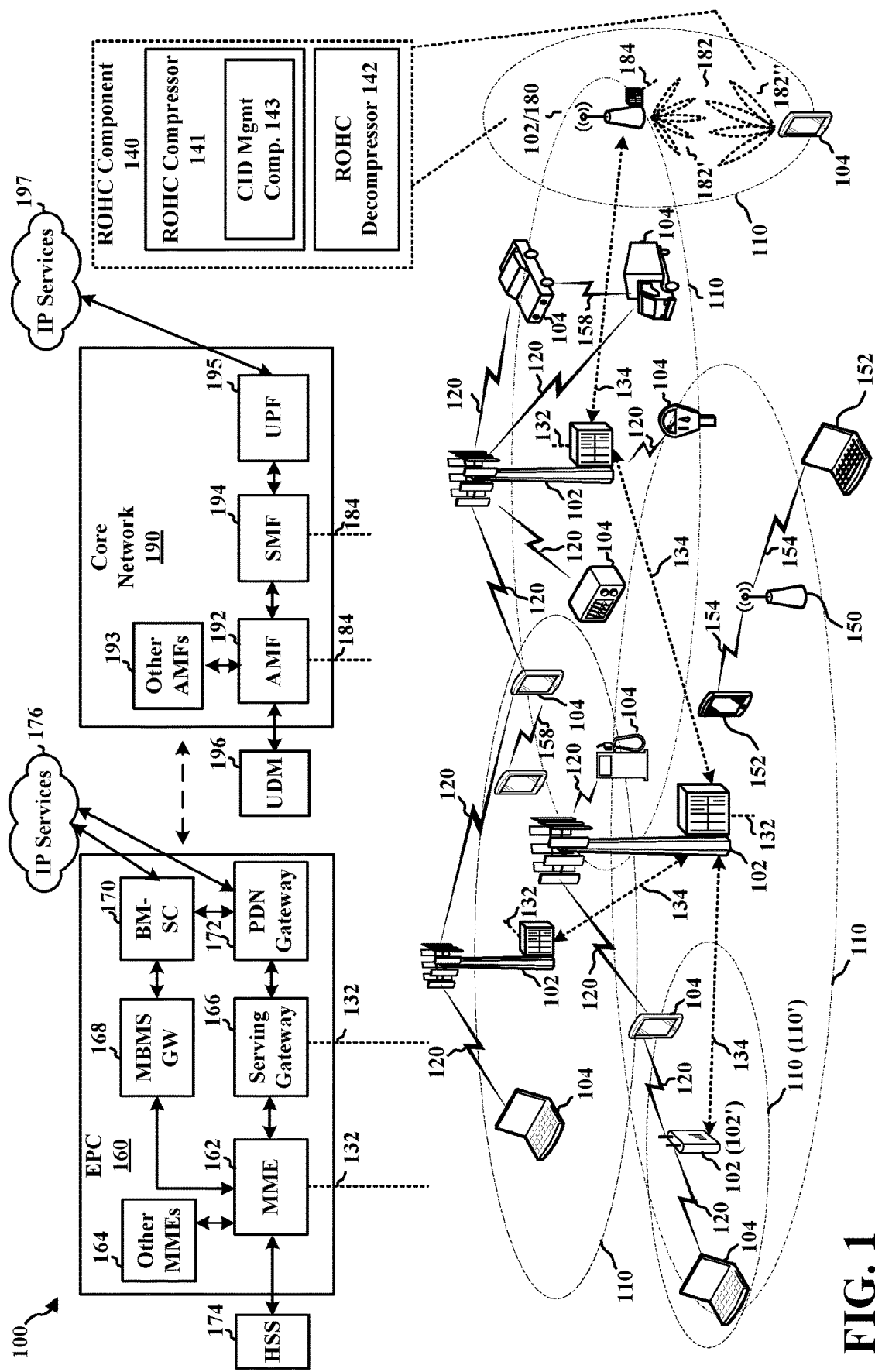
FIG. 1 is a diagram illustrating an example of a wireless communications system and an access network, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for implementing ROHC improvement and/or optimization to avoid decompression failure and improve channel throughput with ROHC context replication. In general, a compressor at the transmitter device, as well as a decompressor at the receiver device, may implement ROHC for compressing and/or decompressing headers of TCP/Internet Protocol (IP) data packets. Further, ROHC may employ a context replication mechanism that establishes and initializes a replication context based on another existing valid context, i.e., a base context. In some aspects, a transmitter device may employ a ROHC optimization that disassociates a replication context from a base context when a context identifier assigned to the base context is reset. For example, the context identifier of a base context may be reset when the maximum number of contexts has been reached and the context identifier needs to be assigned to the new context. As described in detail herein, once the context identifier has been reset, the replication context identifier of the replication context derived from the base context may be associated with a new base context or established as a base context to avoid decompression failure at the receiver device. Accordingly, the present techniques manage the context identifiers of base and replication contexts, thereby improving channel throughput by preventing retransmissions due to decompression failure.

FIG. 1 is a diagram illustrating an example of a wireless communications system and an access network 100. The wireless communications system (also referred to as a wireless wide area network (WWAN)) includes base stations 102. UEs 104, an Evolved Packet Core (EPC) 160, and another core network 190 (for example, a 5G Core (5GC)). The base stations 102 and UEs 104 may include a ROHC component 140 having a decompressor (e.g., of a receiver device) and a compressor (e.g., of a transmitter device) configured to manage context identifiers to avoid or reduce decompression failures and/or uncompressed (e.g., higher overhead) data packet transmissions, as described in more detail below.

In certain aspects, the UE 104 and the base station 102/180 may be configured to communicate using one or more ROHC protocol techniques as described below with reference to FIGS. 3-7. The UE 104 and the base station 102/180 may include a ROHC component 140 for compressing and/or decompressing data packets. For example, the ROHC component 140 may include a ROHC compressor 141 having one or more compression algorithms or profiles used to compress a data packet to be sent to a receiver device, and a ROHC decompressor 142 having one or more decompression algorithms or profiles used to decompress a compressed data packet received from a transmitter device. Notably, the ROHC compressor 141 may include a context identifier (CID) management component 143 configured to manage context identifiers to avoid or reduce decompression failures and/or uncompressed data packet transmissions, as described in detail herein. For example, the CID management component 143 may be configured to disassociate base context identifiers and replication context identifiers after the base context identifier has been assigned to a new context, and associate the replication context with a new base context before employing the replication context to compress a packet.

The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace. RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (416 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a satellite phone, a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A. CDMA, GSM, and other wireless technologies.

Figure 2:
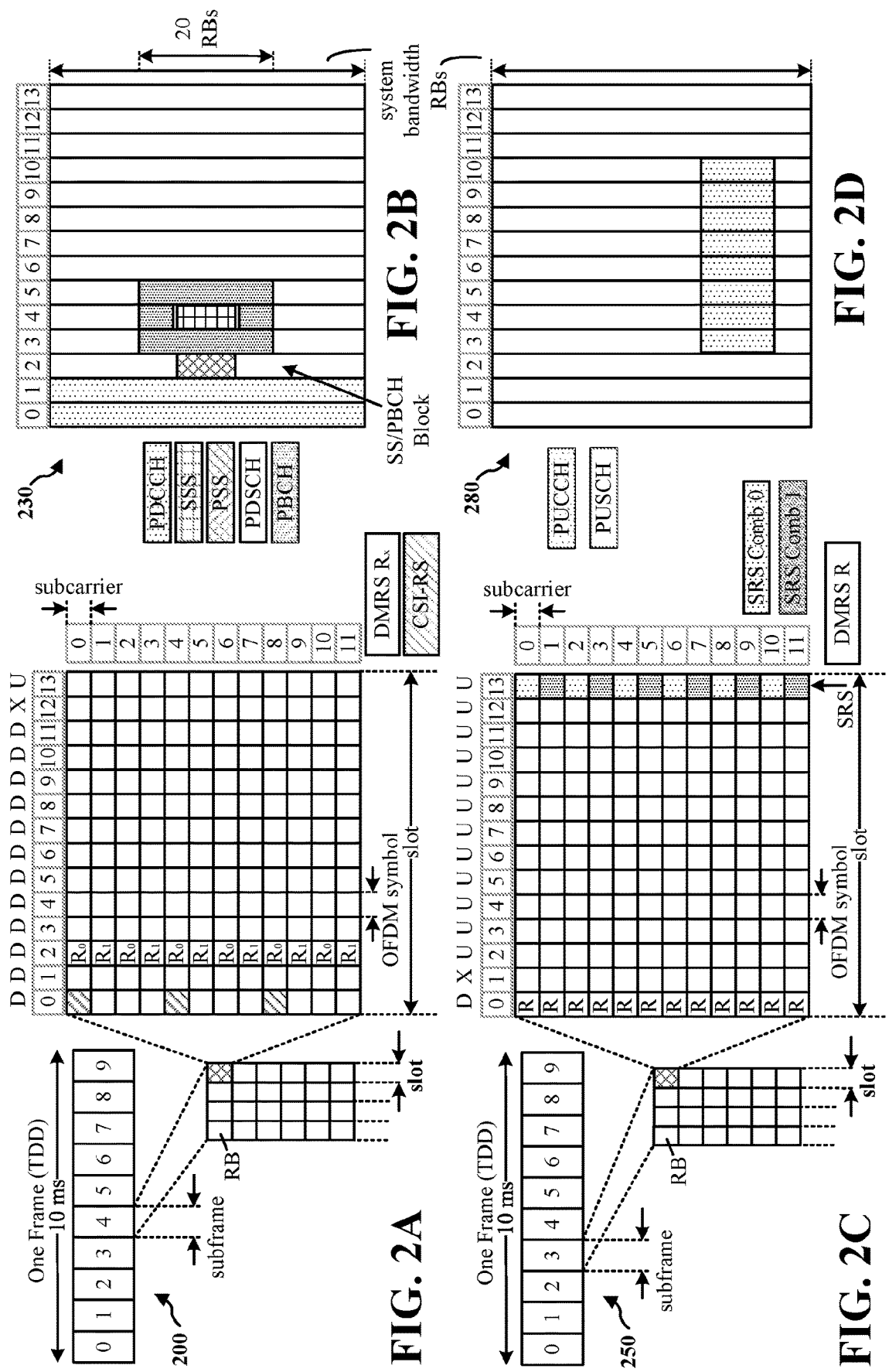
FIG. 2A is a diagram illustrating an example of a first 5G/NR frame, in accordance with some aspects of the present disclosure.
FIG. 2B is a diagram illustrating an example of DL channels within a 5G/NR subframe, in accordance with some aspects of the present disclosure.
FIG. 2C is a diagram illustrating an example of a second 5G/NR frame, in accordance with some aspects of the present disclosure.
FIG. 2D is a diagram illustrating an example of UL channels within a 5G/NR subframe, in accordance with some aspects of the present disclosure.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology u, there are 14 symbols/slot and 2μ slots/subframe. The subcarrier spacing and symbol length/duration are a function of the numerology. The subcarrier spacing may be equal to $2^{\mu}*15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
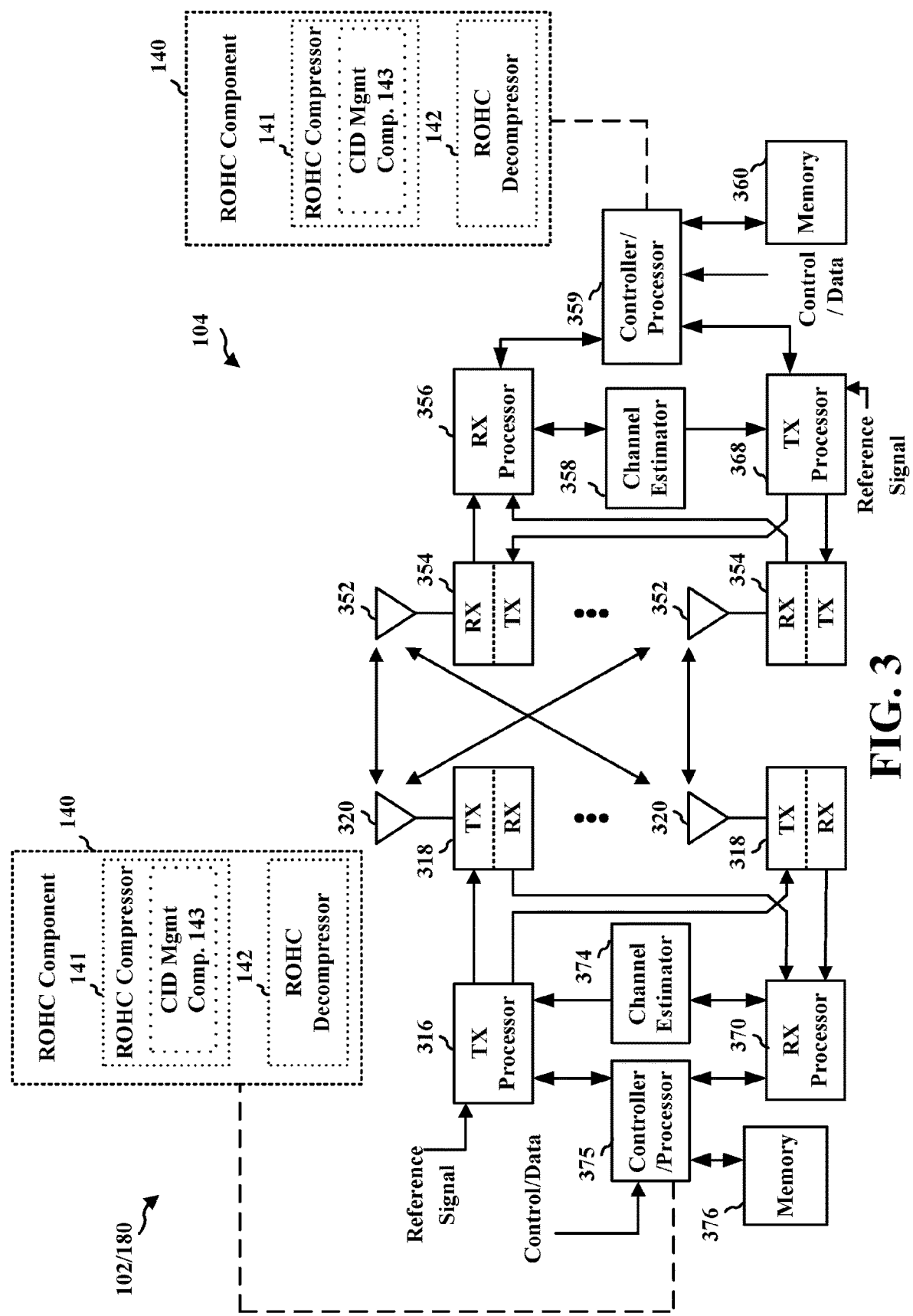
FIG. 3 is a diagram illustrating an example of a base station and a UE in an access network, in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

At the UE 104, least one of the TX processor 368, the RX processor 356, and the controller/processor 359 may be configured to perform aspects in connection with the ROHC component 140 of FIG. 1. Similarly, at the base station 102 or 180, at least one of the TX processor 316, the RX processor 370, and the controller/processor 375 may be configured to perform aspects in connection with the ROHC component 140 of FIG. 1.

In some systems, protocol headers may be compressed due to the redundancy in the header fields of the same packet as well as consecutive packets of the same packet stream. For instance, a packet classifier can identify different packet streams by the combination of parameters and protocol headers being carried in the packet, e.g., the source and destination addresses, and the source and destination ports, etc. Initially, a few packets are sent uncompressed and are used to establish the context on both sides of the link. In some aspects, the context may comprise information about static fields, dynamic fields, and the change pattern of the static and dynamic fields within protocol headers. Further, the context may be used by a compressor to compress the packet and then by the decompressor to decompress the packet to its original state.

Additionally, there is often some redundancy between header fields of different flows that pass through the same compressor-decompressor pair. This means that some of the information needed to initialize the context for decompressing the headers of a new flow may already be present at the decompressor. As such, it may be desirable to reuse this information and remove some of the overhead normally required for the initialization of a new header compression context at both the compressor and decompressor via context replication (CR). In some aspects, CR allows some header fields, such as the IP source and/or destination addresses (16 octets each for IPv6), to be omitted within the special Initiation and Refresh (IR) packet type specifically defined for replication. It also allows other fields, such as source and/or destination ports, to be either omitted or sent in a compressed form from the first packet of the header compressed flow. The purpose of the CR is to initialize a new context by reusing an already existing context. In this state, the compressor sends a combination of uncompressed and compressed information, along with a reference to a base context plus some additional information. Therefore, header information pertaining to fields that are being replicated is not sent.

Typically, in a CR application, a base context identifier and a replication context identifier may initially be associated due to a relationship between the base context and replication context. Further, the base context identifier may be assigned to a new context without the relationship between the base context identifier and replication context identifier being updated. As a result, the transmitter device may transmit a compressed packet in accordance with the replication context that includes the base context identifier and the replication context identifier, which will cause decompression failure at the receiver device as the receiving device attempts to decompress the compressed packet using the new context and not the base context formerly assigned the base context identifier. As a result, the transmitter device will have to retransmit the packet which may cause low overall TCP throughput.

The present disclosure provides techniques for employing ROHC improvement and/or optimization to avoid and/or reduce decompression failure and improve channel throughput with ROHC context replication. As described above, current ROHC techniques fail to disassociate base context identifiers and replication context identifiers after the base context identifier has been assigned to a new context. Accordingly, the present techniques update context identifier relationships between a base context and one or more replication contexts, thereby reducing decompression failure and improving channel throughput.

The method of optimizing ROHC optimization to avoid decompression failure is further described below with reference to FIGS. 5-7.

Figure 4:
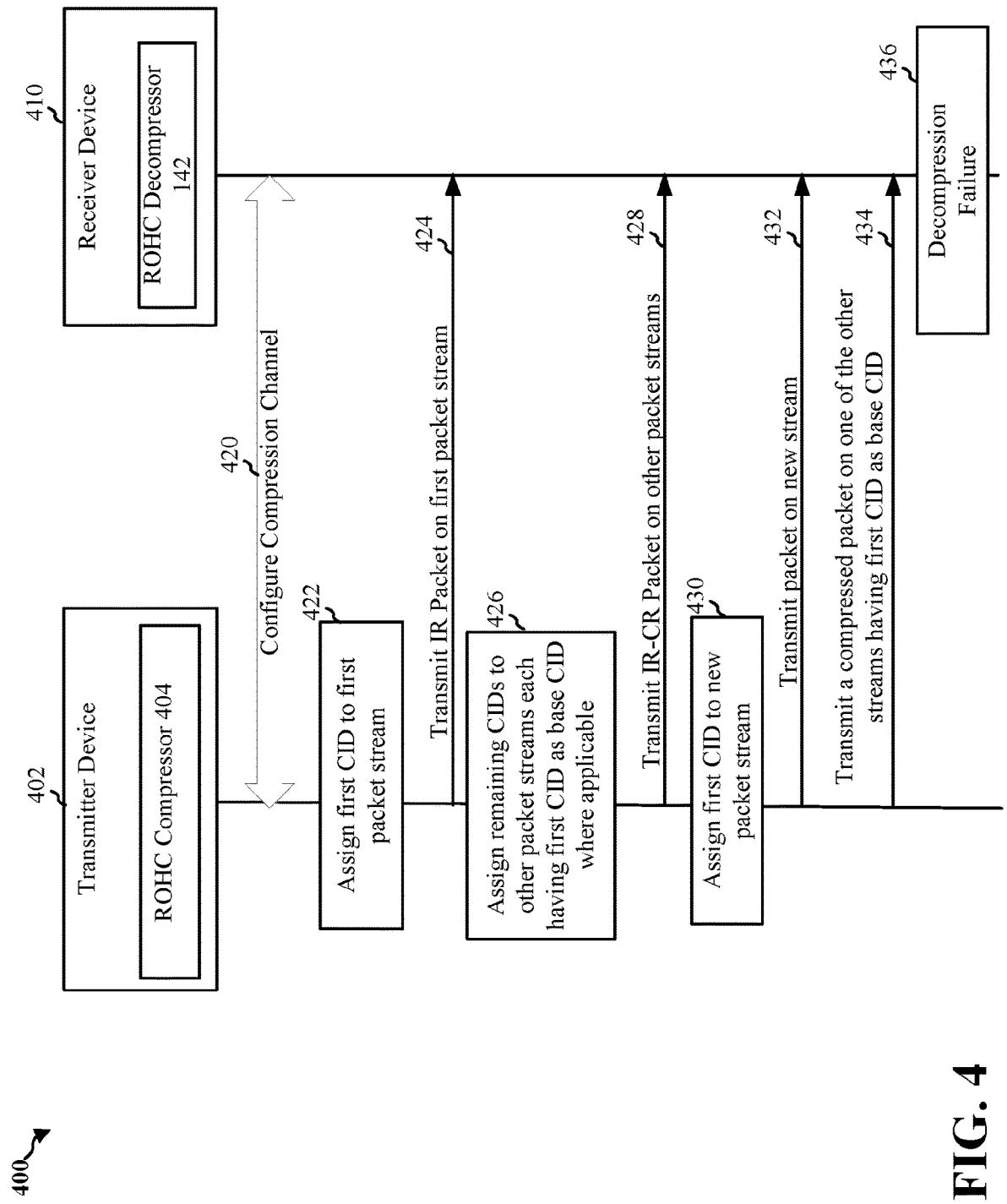
FIG. 4 is a diagram illustrating a first example of communications and components of a base station and UEs, in accordance with some aspects of the present disclosure.

FIG. 4 illustrates a flow diagram 400 for operations at a transmitter device 402 and a receiver device 410 of a wireless communication system and message exchanges between the transmitter device 402 and the receiver device 410. For example, in an implementation, one of the base station 102 or the UE 104 of wireless communication system 100 (FIG. 1) may be the transmitter device 402, and the other one of the base station 102 or the UE 104 may be the receiver device 410. As illustrated in FIG. 4, the transmitter device 402 may include the ROHC compressor 404, and the receiver device 410 may include the ROHC decompressor 142.

As illustrated in FIG. 4, at step 420, the ROHC compressor 404 may configure a compression channel with the ROHC decompressor 142. For example, the ROHC compressor 404 and the ROHC decompressor 142 may configure a ROHC channel with TCP profile. Further, the ROHC compressor 404 may determine a first context for a first packet stream and assign a first context identifier to the first context of a first packet stream at step 422. Given that no other context has been identified prior to the first context, the ROHC compressor 404 will be unable to employ context replication. In addition, at step 424, the ROHC compressor may transmit a ROHC IR packet to the ROHC decompressor 142 to establish the first context at the receiver device 410. At step 426, the ROHC compressor 404 may determine a one or more other contexts of one or more other packet streams, and determine that conflict replication can be employed for the one or more other contexts with the first context as the base context. Further, the ROHC compressor 404 may generate and transmit compressed packets, according to an IR-CR packet format, that include the context identifier for the particular other context and the first context identifier at step 428.

At step 430, the ROHC compressor 404 may identify a new context, determine that the maximum number of context permitted between the transmitter device 402 and the receiver device 410 has been reached, and reassign the first context identifier to the new context. As a result, ROHC compressor 404 may transmit a ROHC IR packet to the ROHC decompressor 142 to establish the new context at the receiver device 410 at step 432.

Typically, at step 434, after the reassignment of the first context identifier to the new context, the ROHC compressor 404 may continue to employ context replication with respect to the other contexts, and transmit a compressed packet including the first context identifier and a context identifier of one of the other contexts. At step 436, the ROHC decompressor 142 may fail to decompress the compressed packet as the ROHC decompressor 142 will attempt to use the new context to decompress the compressed packet using the new context given that the first context identifier associated with the new context is included in the compressed packet. Further, failure to decompress the compressed packet will result in retransmission, which negatively affects channel throughput.

Figure 5:
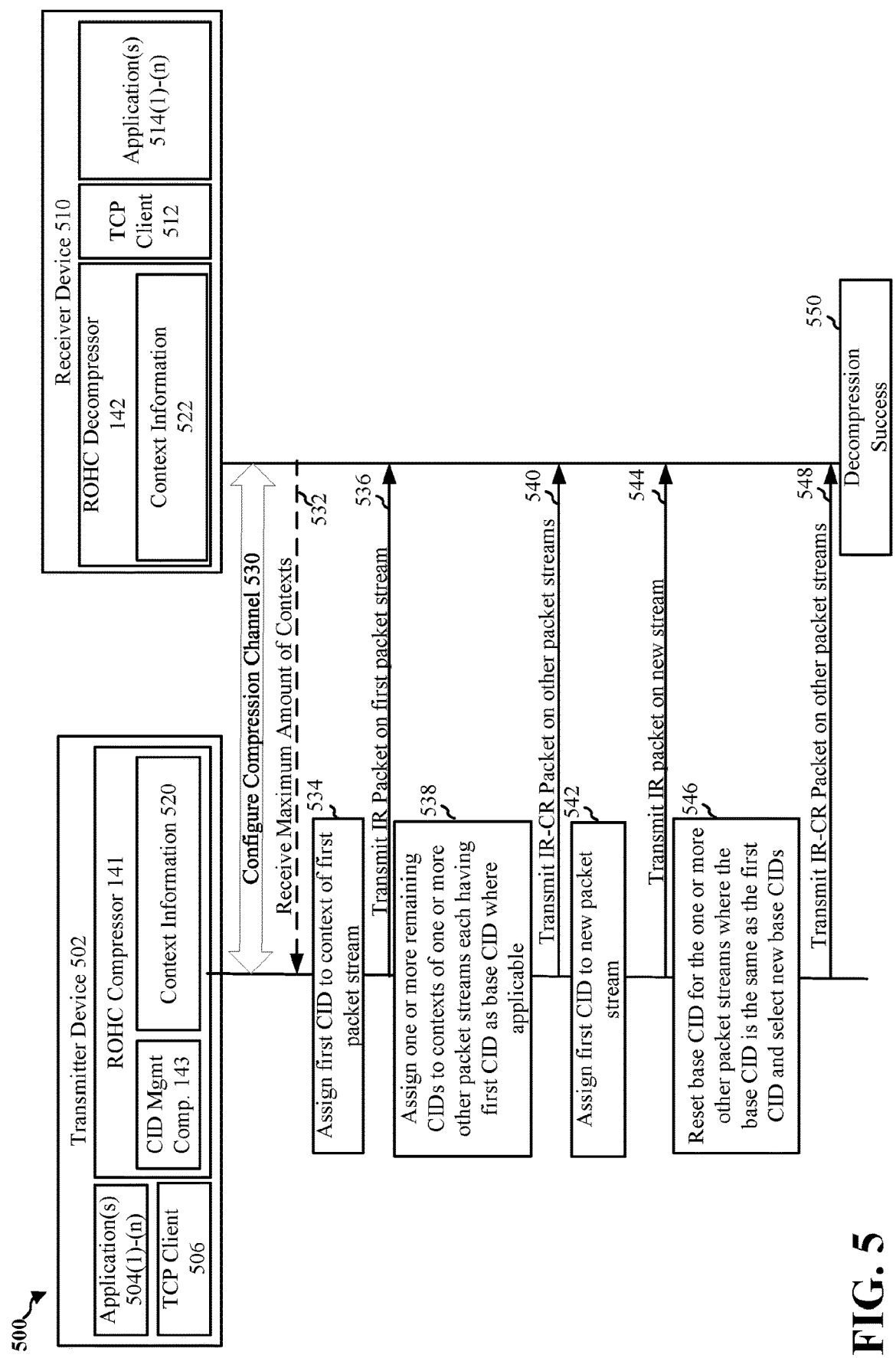
FIG. 5 is a diagram illustrating a second example of communications and components of a base station and UEs, in accordance with some aspects of the present disclosure.

FIG. 5 illustrates a flow diagram 500 for operations at a transmitter device 502 and a receiver device 510 of a wireless communication system and message exchanges between the transmitter device 502 and the receiver device 510. For example, in an implementation, one of the base station 102 or the UE 104 of wireless communication system 100 (FIG. 1) may be the transmitter device 502, and the other one of the base station 102 or the UE 104 may be the receiver device 510.

As illustrated in FIG. 5, the transmitter device 502 may include the ROHC compressor 141, one or more applications 504, a TCP client 506 employed by the one or more applications for communications with and/or via the receiver device 510, and context information 520. Further, the receiver device 510 may include the ROHC decompressor 142, a TCP client 512 in communication with the TCP client 506, and context information 522. The ROHC compressor 141 and the ROHC decompressor 142 may operate in a unidirectional mode (U-mode), a bi-directional optimistic mode (O-mode), or a bi-directional reliable mode (R-mode). In each mode, the ROHC compressor 141 may be in an initialization and refresh (IR) state, a context replication (CR) state, a first order (FO) state, or a second order (SO) state. The states describe the increasing level of confidence about the correctness of the context at the ROHC decompressor 142. This confidence is reflected in the increasing compression of packet headers. Further, in case of error conditions, the ROHC compressor 141 may move to a lower state to send packets that carry enough information to fix the error in the context of the ROHC decompressor 142.

In the IR state, the ROHC compressor 141 may transmit complete header information. For example, an IR packet may include a context identifier, all static and non-static fields in uncompressed forms. In the CR state, the ROHC compressor 141 may transmit a combination of uncompressed and compressed information, along with a reference, e.g., a base context identifier, to a base context plus some additional information. Therefore, header information pertaining to fields that are being replicated is not sent. For example, an IR-CR packet may communicate the static and the dynamic parts of the replicated context, a context identifier, and a base context identifier.

In some aspects, the ROHC compressor 141 may start in the IR state, and transition to the CR state under the constraint that the compressor may select a base context that is suitable for the flow being compressed. In some aspects, to perform a transition between the IR state and the CR state, the ROHC compressor 141 may select a context that has previously been acknowledged by the ROHC decompressor 142 to be the base context for the replication context. In some aspects, the selected context may been acknowledged by the ROHC decompressor 142 in a feedback message. Further, in some aspects, the static part of the base context to be replicated must have been acknowledged by the ROHC decompressor 142 and the base context must be valid at replication time. Further, the ROHC compressor 141 may stay in the CR state until the ROHC compressor 141 is confident that ROHC decompressor 142 has received the replication information correctly.

Further, as illustrated in FIG. 5, the ROHC compressor 141 includes a context identifier management (CID management) component 143 and context information 520. As described in detail herein, the CID management component 143 may be configured to manage the context identifiers of base and replication contexts, thereby improving channel throughput by preventing retransmissions due to decompression failure.

The ROHC decompressor 142 may operate in a no-context state, a static-context state, or a full-context state. The transmitter device 502 may transmit a packet compressed by the ROHC compressor 141 to the receiver device 510. The receiver device 510 may employ the ROHC decompressor 142 to decompress the compressed packet received from the transmitter device 502. Further, when a feedback channel is available, the ROHC decompressor 142 may send feedback regarding the decompression performed to the ROHC compressor 141 on the feedback channel. Upon reception of an IR-CR packet, the ROHC decompressor 142 creates a new context using the information present in the IR-CR packet together with the identified base context, and decompresses the original header. When the decompression is verified and successful, the ROHC decompressor 142 initializes or updates the context with the information received in the current header.

As illustrated in FIG. 5, at step 530, the ROHC compressor 141 may configure a compression channel with the ROHC decompressor 142. For example, ROHC compressor 141 and the ROHC decompressor 142 may configure a ROHC channel with TCP profile. In addition, at step 532, the receiver device 510 may optionally transmit CR configuration information indicating the maximum amount of active contexts permitted over a channel between the transmitter device 502 and the receiver device 510. In some aspects, the receiver device 510 may transmit the CR configuration information within RRC signaling.

Further, the ROHC compressor 141 may determine a first context for a first packet stream of the TCP client 506, and assign a first context identifier to the first context within the context information 520, at step 534. In addition, in some aspects, the ROHC compressor 141 may be unable to employ context replication, e.g., the context may be the first context initialized. In addition, at step 536, the ROHC compressor may transmit one or more ROHC IR packets to the ROHC decompressor 142 to establish the first context at the receiver device 510. At step 538, the ROHC compressor 141 may determine a plurality of other contexts and determine that CR can be employed for the plurality of other contexts with the first context as the base context. Each of the other contexts may be assigned a context identifier within the context information 520, and the context identifiers of the other contexts may be associated with the first context identifier within the context information 520. Further, the ROHC compressor 141 may generate and transmit compressed packets, according to an IR-CR packet format, with each packet including the context identifier for the particular other context and the first context identifier at step 540.

At step 542, the ROHC compressor 141 may identify a new context and determine that the maximum number of contexts permitted on the channel between the transmitter device 502 and the receiver device 510 has been reached. For example, the CID management component 143 may monitor the number of active contexts, compare the number of active contexts between the transmitter device 502 and the receiver device 510 to the maximum number of contexts permitted between the transmitter device 502 and the receiver device 510, and determine that the two values are equal. As a result, the CID management component 143 may reassign the first context identifier to the new context within the context information 520. In some aspects, the CID management component 143 may select the first context identifier based on the base context being the least-recently used context among the active contexts within the context information 520. Further, the transmitter device 502 may transmit one or more ROHC IR packets to the ROHC decompressor 142 to establish the new context at the receiver device 510, at step 544.

At step 546, in response to the reassignment of the first context identifier to the new context, the CID management component 143 may disassociate the context identifiers of the other contexts from the first context identifier within the context information 520, select a new base CID for each of the other contexts, and associate the other context identifiers to the new based context identifiers within the context information 520. In some aspects, the new context may be the base context for one of the other context based on the CID management component 143 determining that the other context may be derived from the new context.

Further, the ROHC compressor 141 may generate and transmit compressed packets according to an IR-CR packet format, for each of the other context that includes the new base CID and the context identifier of the other context, at step 548.

As illustrated at step 550, the ROHC decompressor 142 may successfully decompress compressed packets associated with the other contexts as the ROHC decompressor 142 will have knowledge of the update to the base context for the other contexts in response to reassignment of the first context identifier to the new context.

Alternatively, if the CID management component 143 is unable to identify a base context for one of the other context, the ROHC compressor 141 may establish the other context as an independent context without a base context. For example, the ROHC compressor 141 may transmit an IR packet for the other context to re-initialize the other context in response to the inability to find a new base context.

Figure 6:
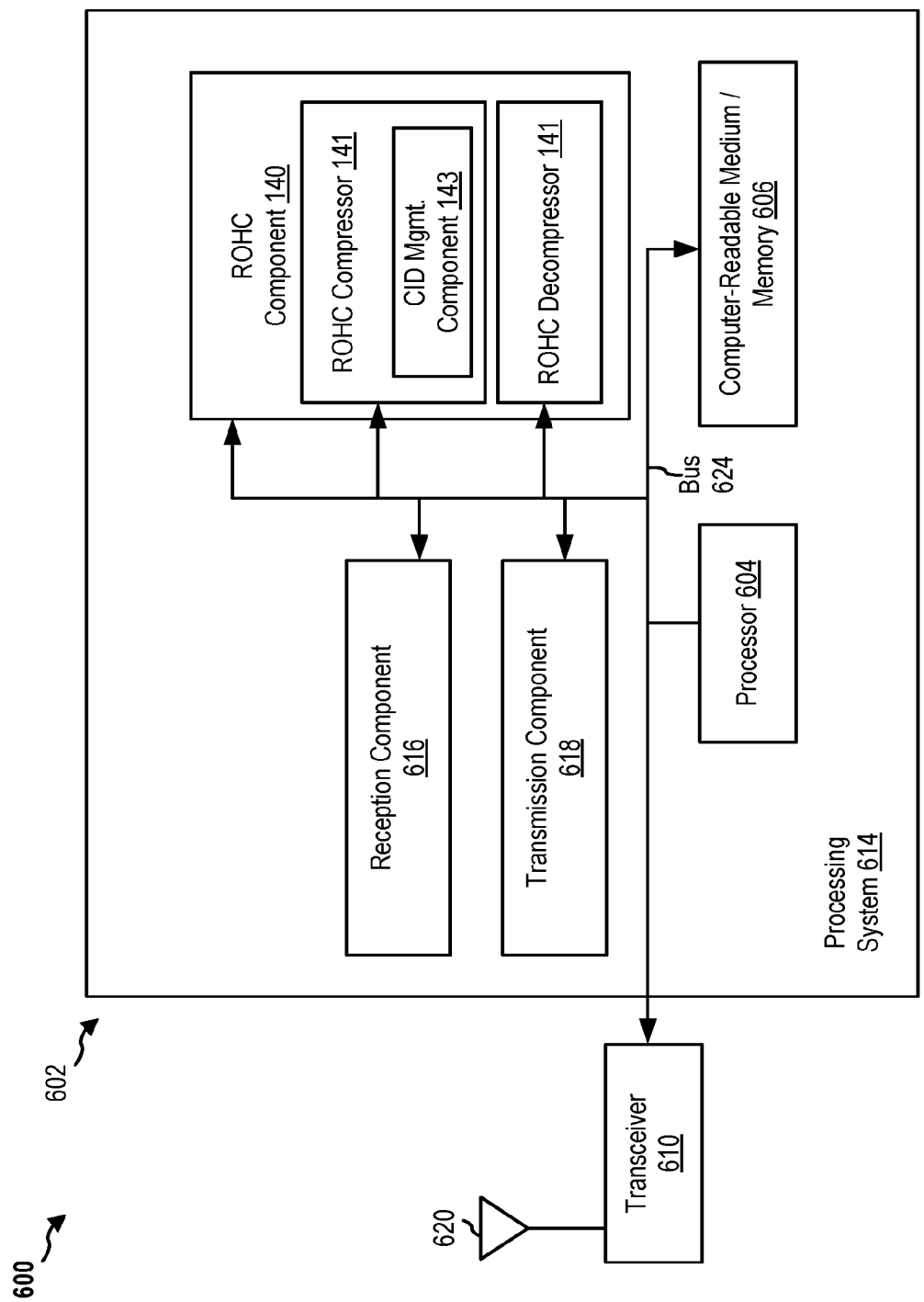
FIG. 6 is a diagram illustrating an example of a hardware implementation for a transmitter/receiver device employing a processing system, in accordance with some aspects of the present disclosure.

FIG. 6 is a diagram 600 illustrating an example of a hardware implementation for a transmitter device 602 or receiver device 610 employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the ROHC component 140, the ROHC compressor 141, the ROHC decompressor 142, the CID management component 143, and the computer-readable medium/memory 606. The bus 624 may also link various other circuits such as timing sources, peripherals, voltage regulators, and power management circuits, which are well known in the art, and therefore, will not be described any further.

The processing system 614 may be coupled with a transceiver 610. The transceiver 610 is coupled with one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 616. The reception component 616 may receive the IR packets, IR-CR packets, and CR configuration information. In addition, the transceiver 610 receives information from the processing system 614, specifically the transmission component 618, and based on the received information, generates a signal to be applied to the one or more antennas 620. Further, the transmission component 618 may send IR packets, IR-CR packets, and CR configuration information.

The processing system 614 includes a processor 604 coupled with a computer-readable medium/memory 606 (e.g., a non-transitory computer readable medium). The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes the ROHC component 140, the ROHC compressor 141, the ROHC decompressor 142, and the CID management component 143. The aforementioned components may be software components running in the processor 604, resident/stored in the computer readable medium/memory 606, one or more hardware components coupled with the processor 604, or some combination thereof. The processing system 614 may be a component of the base station 310 and may include the memory 376 and/or at least one of the TX processor 316, the RX processor 370, and the controller/processor 375. Alternatively, the processing system 614 may be the entire base station (e.g., see 310 of FIG. 3, 510 of FIG. 5). Additionally, the processing system 614 may be a component of the UE 350 and may include the memory 360 and/or at least one of the TX processor 368, the RX processor 356, and the controller/processor 359. Alternatively, the processing system 614 may be the entire UE (e.g., see 350 of FIG. 3).

The aforementioned means may be one or more of the aforementioned components of the transmitter device 602 and/or the processing system 614 of the transmitter device 602 configured to perform the functions recited by the aforementioned means. As described supra, the processing system 614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means. Further, as described supra, the processing system 614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 7:
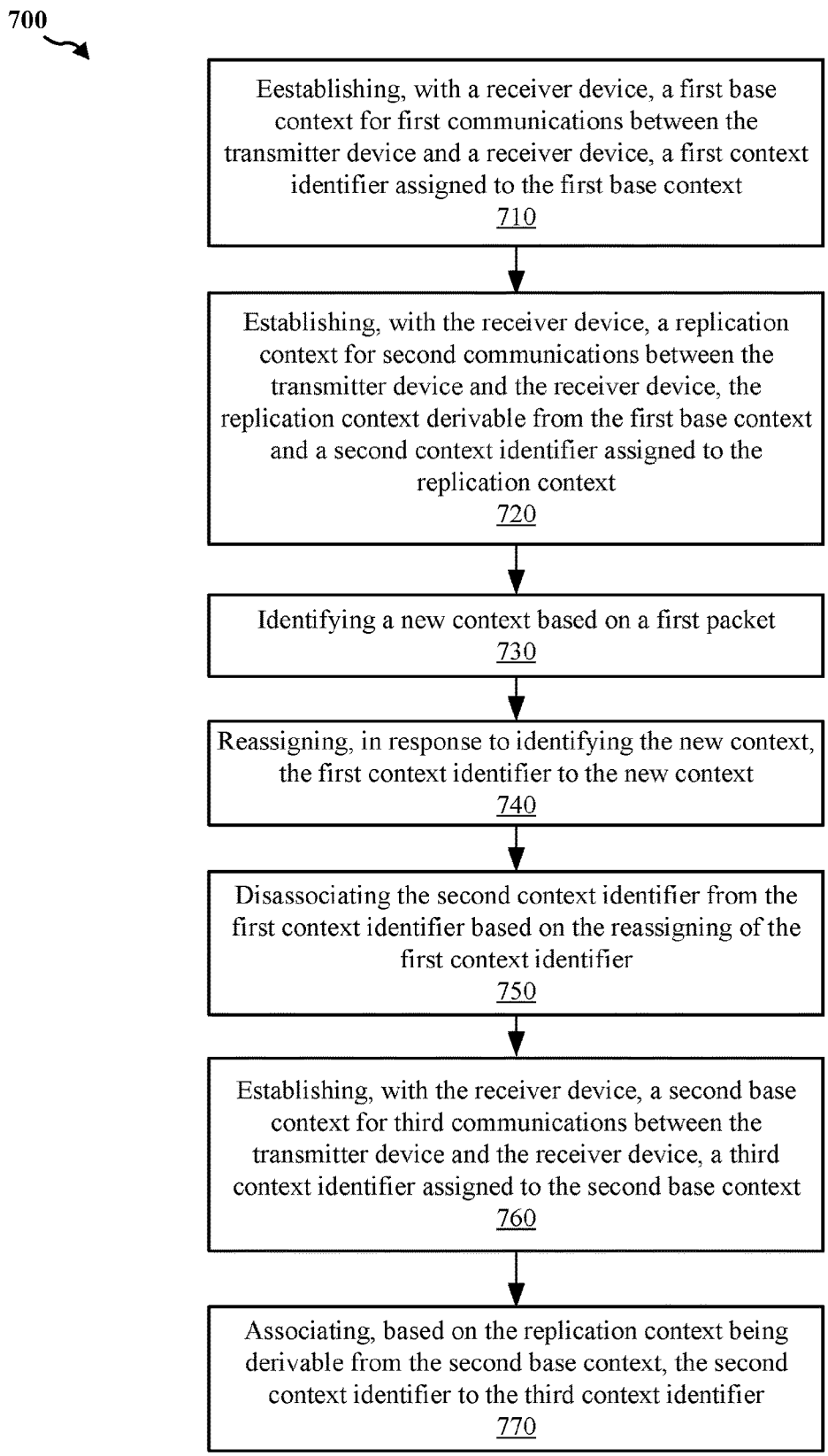
FIG. 7 is a flowchart of an example method of implementing ROHC optimization to avoid decompression failure at a base station, in accordance with some aspects of the present disclosure.

FIG. 7 is a flowchart of a method 700 of implementing ROHC optimization to avoid decompression failure. The method may be performed by a transmitter device, e.g., the transmitter devices 502 and 602. The method may be performed by a base station (e.g., the base station 102, which may include the memory 376 and which may be the entire base station or a component of the base station, such as ROHC component 140, the TX processor 316, the RX processor 370, and/or the controller/processor 375). In addition, the method may be performed by a UE (e.g., the UE 104 of FIGS. 1 and 3, which may include the memory 360 and which may be the entire UE 104 or a component of the UE 104, such as ROHC component 140, the TX processor 368, the RX processor 356, and/or the controller/processor 359).

At block 710, the method 700 may include establishing, with a receiver device, a first base context for first communications between the transmitter device and a receiver device, wherein a first context identifier is assigned to the first base context. For example, the ROHC compressor 141 may identify a first context based on a packet received from the TCP client 506 for a first packet stream, assign a first context identifier to the first context within the context information 520, and establish the first context within the context information 522 of the ROHC decompressor 142 via one or more IR packets.

Accordingly, the transmitter device 602, the base station 102, the TX processor 316, the RX processor 370, the controller/processor 375, the UE 104, the TX processor 368, the RX processor 356, and/or the controller/processor 359 executing the ROHC compressor 141 may provide means for establishing, with a receiver device, a first base context for first communications between the transmitter device and a receiver device, wherein a first context identifier is assigned to the first base context.

At block 720, the method 700 may include establishing, with the receiver device, a replication context for second communications between the transmitter device and the receiver device, the replication context derivable from the first base context and a second context identifier assigned to the replication context. For example, the ROHC compressor 141 may identify a second context on a packet received from the TCP client 506 for a second packet stream, assign a second context identifier to the second context within the context information 520, determine that the second context is derivable from the first context, associate the first context identifier and the second context identifier within the context information 520, and establish the second context within the context information 522 of the ROHC decompressor 142 via one or more IR-CR packets.

Accordingly, the transmitter devices 502 and 602, the base station 102, the TX processor 316, the RX processor 370, the controller/processor 375, the UE 104, the TX processor 368, the RX processor 356, and/or the controller/ processor 359 executing the ROHC compressor 141 may provide means for establishing, with the receiver device, a replication context for second communications between the transmitter device and the receiver device, the replication context derivable from the first base context and a second context identifier assigned to the replication context.

At block 730, the method 700 may include identifying a new context based on a first packet. For example, the ROHC compressor 141 may identify a new context based on a packet received from the TCP client 506. In some aspects, the ROHC compressor 141 may determine that none of the existing contexts may be used for a new packet of a new packet stream received from the TCP client 506. Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor 141 may provide means for identifying a new context based on a first packet.

At block 740, the method 700 may include reassigning, in response to identifying the new context, the first context identifier to the new context. For example, the CID management component 143 may compare the number of active contexts between the transmitter device 502 and the receiver device 510 to the maximum number of contexts permitted between the transmitter device 502 and the receiver device 510, and determine that the two values are equal. As a result, the CID management component 143 may reassign the first context identifier to the new context within the context information 520. In some aspects, the CID management component 143 may select the first context identifier based on the base context being the least-recently used context among the active contexts within the context information 520. Further, in some aspects, the transmitter device 502 may transmit one or more IR packets to the ROHC decompressor 142 to establish the new context within the context information 522 at the receiver device 510.

Accordingly, the transmitter devices 502 and 602, the base station 102, the TX processor 316, the RX processor 370, the controller/processor 375, the UE 104, the TX processor 368, the RX processor 356, and/or the controller/processor 359 executing the CID management component 143 may provide means for reassigning, in response to identifying the new context, the first context identifier to the new context.

At block 750, the method 700 may include disassociating the second context identifier from the first context identifier based on the reassigning of the first context identifier. For example, the CID management component 143 may disassociate the first context identifier and the second context identifier within the context information 520 based on the reassignment of the first context identifier to the new context.

Accordingly, the transmitter devices 502 and 602, the base station 102, the TX processor 316, the RX processor 370, the controller/processor 375, the UE 104, the TX processor 368, the RX processor 356, and/or the controller/processor 359 executing the CID management component 143 may provide means for disassociating the second context identifier from the first context identifier based on the reassigning of the first context identifier.

At block 760, the method 700 may include establishing, with the receiver device, a second base context for third communications between the transmitter device and the receiver device, a third context identifier assigned to the second base context. For example, the ROHC compressor 141 may identify a third context based on a packet received from the TCP client 506 for a third packet stream, assign a third context identifier to the third context within the context information 520, and establish the third context within the context information 522 of the ROHC decompressor 142 via one or more IR packets or IR-CR packets.

Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor 141 may provide means for establishing, with the receiver device, a second base context for third communications between the transmitter device and the receiver device, a third context identifier assigned to the second base context.

At block 770, the method 700 may include associating, based on the replication context being derivable from the second base context, the second context identifier to the third context identifier. For example, in response to disassociating the second context identifier from the first context identifier, the CID management component 143 may determine that the second context is derivable from the third context, and associate the second context identifier and the third context identifier within the context information 520. Further, the CID management component 143 update the second context within the context information 522 of the ROHC decompressor 142 via one or more IR-CR packets including the first context identifier and the third context identifier.

Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor 141 and/or the CID management component 143 may provide means for associating, based on the replication context being derivable from the second base context, the second context identifier to the third context identifier.

In an additional aspect, the method 700 further comprises transmitting, as a derivative packet type, a second packet as a compressed packet including the second context identifier and the third context identifier. In some aspects, the compressed packet distinguishes between static and dynamic parts associated with the replication context that differ from the second base context. Further, in some aspects, the derivative packet type is IR-CR packet type. Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor 141 may provide means for transmitting, as a derivative packet type, a second packet as a compressed packet including the second context identifier and the third context identifier.

In an additional aspect, the method 700 further comprises compressing, based on the replication context, a second packet to determine a compressed second packet, and transmitting the compressed second packet to the receiver device. In some aspects, the compressing may include compressing the second packet according to a ROHC protocol technique corresponding to the second context identifier and the third context identifier to create the compressed second packet. Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor 141 may provide means for compressing, based on the replication context, a second packet to determine a compressed second packet, and transmitting the compressed second packet to the receiver device.

In an additional aspect, reassigning the first context identifier to the new context comprises determining that a number of context identifiers currently in use between the transmitter device and the receiver device and determining that the number of context identifiers is equal to a maximum number of context identifiers allocated to the transmitter device and destination device. In some aspects, the transmitter device 502 may receive RRC signaling including the maximum number of context identifiers allocated to the transmitter device and the destination device. Accordingly, the transmitter devices 502 and 602, the base station 102, the TX processor 316, the RX processor 370, the controller/processor 375, the UE 104, the TX processor 368, the RX processor 356, and/or the controller/processor 359 executing the CID management component 143 may provide means for determining that a number of context identifiers currently in use between the transmitter device and the receiver device and determining that the number of context identifiers is equal to a maximum number of context identifiers allocated to the transmitter device and destination device.

In an additional aspect, reassigning the first context identifier to the new context comprises selecting the first context identifier for reassignment based on the first context identifier being identified as least recently-used over a plurality of context identifiers assigned to the transmitter device and the receiver device. Accordingly, the transmitter devices 502 and 602, the base station 102, the TX processor 316, the RX processor 370, the controller/processor 375, the UE 104, the TX processor 368, the RX processor 356, and/or the controller/processor 359 executing the CID management component 143 may provide means for selecting the first context identifier for reassignment based on the first context identifier being identified as least recently-used over a plurality of context identifiers assigned to the transmitter device and the receiver device.

In an additional or alternative aspect, wherein the replication context is a first replication context, the method 700 further comprises disassociating, based on the reassigning of the first context identifier, a fourth context identifier associated with a second replication context from the first context identifier, and establishing, with the receiver device, a third base context for fourth communications between the transmitter device and the receiver device, the fourth context identifier assigned to the second base context. Accordingly, the transmitter devices 502 and 602, the base station 102, the TX processor 316, the RX processor 370, the controller/processor 375, the UE 104, the TX processor 368, the RX processor 356, and/or the controller/processor 359 executing the ROHC compressor and the CID management component 143 may provide means for disassociating, based on the reassigning of the first context identifier, a fourth context identifier associated with a second replication context from the first context identifier, and establishing, with the receiver device, a third base context for fourth communications between the transmitter device and the receiver device, the fourth context identifier assigned to the second base context.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B. or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A. B. or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE CLAUSES

A. A method of wireless communication at a transmitter device comprising establishing, with a receiver device, a first base context for first communications between the transmitter device and a receiver device, wherein a first context identifier is assigned to the first base context, establishing, with the receiver device, a replication context for second communications between the transmitter device and the receiver device, the replication context derivable from the first base context and a second context identifier assigned to the replication context, identifying a new context based on a first packet, reassigning, in response to identifying the new context, the first context identifier to the new context, disassociating the second context identifier from the first context identifier based on the reassigning of the first context identifier, establishing, with the receiver device, a second base context for third communications between the transmitter device and the receiver device, a third context identifier assigned to the second base context, and associating, based on the replication context being derivable from the second base context, the second context identifier to the third context identifier.

B. The method as paragraph A recites, further comprising transmitting, as a derivative packet type, a second packet as a compressed packet including the second context identifier and the third context identifier.

C. The method as paragraph B recites, wherein the compressed packet distinguishes between static and dynamic parts associated with the replication context that differ from the second base context.

D. The method as paragraph B recites, wherein the derivative packet type is a robust header compression (ROHC) initialization and refresh context replication packet.

E. The method as any of paragraphs A-D recite, further comprising compressing, based on the replication context, a second packet to determine a compressed second packet, and transmitting the compressed second packet to the receiver device.

F. The method as paragraph E recites, wherein compressing the second packet to determine the compressed second packet, comprises: compressing, at a header compressor, the second packet according to a ROHC protocol technique corresponding to the second context identifier and the third context identifier to create the compressed second packet.

G. The method as any of paragraphs A-F recite, wherein reassigning the first context identifier to the new context comprises: determining that a number of context identifiers currently in use between the transmitter device and the receiver device; and determining that the number of context identifiers is equal to a maximum number of context identifiers allocated to the transmitter device and the receiver device.

H. The method as paragraph G recites, further comprising receiving RRC signaling including the maximum number of context identifiers allocated to the transmitter device and the receiver device.

I. The method as any of paragraphs A-H recite, wherein reassigning the first context identifier to the new context comprises: selecting the first context identifier for reassignment based on the first context identifier being identified as least recently-used over a plurality of context identifiers assigned to the transmitter device and the receiver device.

J. The method as any of paragraphs A-I recite, wherein the replication context is a first replication context, and further comprising: disassociating, based on the reassigning of the first context identifier, a fourth context identifier associated with a second replication context from the first context identifier: and establishing, with the receiver device, a third base context for fourth communications between the transmitter device and the receiver device, the fourth context identifier assigned to the second base context.

K. A transmitting device for wireless communication, comprising a memory storing computer-executable instructions: and at least one processor coupled with the memory and configured to execute the computer-executable instructions to perform the method of any of paragraphs A-J.

L. A transmitting device for wireless communication, comprising means for performing the method of any of paragraphs A-J.

M. A non-transitory computer-readable medium storing computer executable code, the code when executed by a processor causes the processor to perform the method of any of paragraphs A-J.

What is claimed is:

1. A method of wireless communication of a transmitter device, comprising:
    establishing, with a receiver device, a first base context for first communications between the transmitter device and the receiver device, wherein a first context identifier is assigned to the first base context;
    establishing, with the receiver device, a replication context for second communications between the transmitter device and the receiver device, the replication context derivable from the first base context and a second context identifier assigned to the replication context;
    identifying a new context based on a first packet;
    reassigning, in response to identifying the new context, the first context identifier to the new context;
    disassociating the second context identifier from the first context identifier based on the reassigning of the first context identifier;
    establishing, with the receiver device, a second base context for third communications between the transmitter device and the receiver device, a third context identifier assigned to the second base context; and
    associating, based on the replication context being derivable from the second base context, the second context identifier to the third context identifier.

2. The method of claim 1, further comprising transmitting, as a derivative packet type, a second packet as a compressed packet including the second context identifier and the third context identifier.

3. The method of claim 2, wherein the compressed packet distinguishes between static and dynamic parts associated with the replication context that differ from the second base context.

4. The method of claim 2, wherein the derivative packet type is a robust header compression (ROHC) initialization and refresh context replication packet.

5. The method of claim 1, further comprising:
    compressing, based on the replication context, a second packet to determine a compressed second packet; and
    transmitting the compressed second packet to the receiver device.

6. The method of claim 5, wherein compressing the second packet to determine the compressed second packet, comprises:
    compressing, at a header compressor, the second packet according to a ROHC protocol technique corresponding to the second context identifier and the third context identifier to create the compressed second packet.

7. The method of claim 1, wherein reassigning the first context identifier to the new context comprises:
    determining that a number of context identifiers currently in use between the transmitter device and the receiver device; and
    determining that the number of context identifiers is equal to a maximum number of context identifiers allocated to the transmitter device and the receiver device.

8. The method of claim 7, further comprising receiving RRC signaling including the maximum number of context identifiers allocated to the transmitter device and the receiver device.

9. The method of claim 1, wherein reassigning the first context identifier to the new context comprises:
    selecting the first context identifier for reassignment based on the first context identifier being identified as least recently-used over a plurality of context identifiers assigned to the transmitter device and the receiver device.

10. The method of claim 1, wherein the replication context is a first replication context, and further comprising:
    disassociating, based on the reassigning of the first context identifier, a fourth context identifier associated with a second replication context from the first context identifier; and
    establishing, with the receiver device, a third base context for fourth communications between the transmitter device and the receiver device, the fourth context identifier assigned to the second base context.

11. A non-transitory computer-readable device having instructions thereon that, when executed by at least one computing device, causes the at least one computing device to perform operations comprising:
- establishing, with a receiver device, a first base context for first communications between a transmitter device and the receiver device, wherein a first context identifier is assigned to the first base context;
- establishing, with the receiver device, a replication context for second communications between the transmitter device and the receiver device, the replication context derivable from the first base context and a second context identifier assigned to the replication context;
- identifying a new context based on a first packet;
- reassigning, in response to identifying the new context, the first context identifier to the new context;
- disassociating the second context identifier from the first context identifier based on the reassigning of the first context identifier;
- establishing, with the receiver device, a second base context for third communications between the transmitter device and the receiver device, a third context identifier assigned to the second base context; and
- associating, based on the replication context being derivable from the second base context, the second context identifier to the third context identifier.

12. The non-transitory computer-readable device of claim 11, wherein the operations further comprise:
- transmitting, as a derivative packet type, a second packet as a compressed packet including the second context identifier and the third context identifier.

13. The non-transitory computer-readable device of claim 12, wherein the compressed packet distinguishes between static and dynamic parts associated with the replication context that differ from the second base context.

14. The non-transitory computer-readable device of claim 12, wherein the derivative packet type is a robust header compression (ROHC) initialization and refresh context replication packet.

15. The non-transitory computer-readable device of claim 11, wherein the operations further comprise:
- compressing, based on the replication context, a second packet to determine a compressed second packet; and
- transmitting the compressed second packet to the receiver device.

16. The non-transitory computer-readable device of claim 15, wherein compressing the second packet to determine the compressed second packet, comprises:
- compressing, at a header compressor, the second packet according to a ROHC protocol technique corresponding to the second context identifier and the third context identifier to create the compressed second packet.

17. The non-transitory computer-readable device of claim 11, wherein reassigning the first context identifier to the new context comprises:
- determining that a number of context identifiers currently in use between the transmitter device and the receiver device; and
- determining that the number of context identifiers is equal to a maximum number of context identifiers allocated to the transmitter device and the receiver device.

18. The non-transitory computer-readable device of claim 17, wherein the operations further comprise receiving RRC signaling including the maximum number of context identifiers allocated to the transmitter device and the receiver device.

19. The non-transitory computer-readable device of claim 11, wherein reassigning the first context identifier to the new context comprises:
- selecting the first context identifier for reassignment based on the first context identifier being identified as least recently-used over a plurality of context identifiers assigned to the transmitter device and the receiver device.

20. The non-transitory computer-readable device of claim 11, wherein the replication context is a first replication context, and the operations further comprise:
- disassociating, based on the reassigning of the first context identifier, a fourth context identifier associated with a second replication context from the first context identifier; and
- establishing, with the receiver device, a third base context for fourth communications between the transmitter device and the receiver device, the fourth context identifier assigned to the second base context.

21. A transmitting device for wireless communication, comprising:
- a memory storing computer-executable instructions; and
- at least one processor coupled with the memory and configured to execute the computer-executable instructions to:
  - establish, with a receiver device, a first base context for first communications between a transmitter device and the receiver device, wherein a first context identifier is assigned to the first base context;
  - establish, with the receiver device, a replication context for second communications between the transmitter device and the receiver device, the replication context derivable from the first base context and a second context identifier assigned to the replication context;
  - identify a new context based on a first packet;
  - reassign, in response to identifying the new context, the first context identifier to the new context;
  - disassociate the second context identifier from the first context identifier based on the reassigning of the first context identifier;
  - establish, with the receiver device, a second base context for third communications between the transmitter device and the receiver device, a third context identifier assigned to the second base context; and
  - associate, based on the replication context being derivable from the second base context, the second context identifier to the third context identifier.

22. The transmitting device of claim 21, wherein the at least one processor is further configured to execute the computer-executable instructions to:
- transmit, as a derivative packet type, a second packet as a compressed packet including the second context identifier and the third context identifier.

23. The transmitting device of claim 22, wherein the compressed packet distinguishes between static and dynamic parts associated with the replication context that differ from the second base context.

24. The transmitting device of claim 22, wherein the derivative packet type is a ROHC initialization and refresh context replication packet.

25. The transmitting device of claim 21, wherein the at least one processor is further configured to execute the computer-executable instructions to:
- compress, based on the replication context, a second packet to determine a compressed second packet; and transmit the compressed second packet to the receiver device.

26. The transmitting device of claim 25, wherein to compress the second packet to determine the compressed second packet, the at least one processor is further configured to execute the computer-executable instructions to:

compress, at a header compressor, the second packet according to a ROHC protocol technique corresponding to the second context identifier and the third context identifier to create the compressed second packet.

27. The transmitting device of claim 21, wherein to reassign the first context identifier to the new context, the at least one processor is further configured to execute the computer-executable instructions to:

determine that a number of context identifiers currently in use between the transmitter device and the receiver device; and determine that the number of context identifiers is equal to a maximum number of context identifiers allocated to the transmitter device and the receiver device.

28. The transmitting device of claim 27, wherein the at least one processor is further configured to execute the computer-executable instructions to:

receive RRC signaling including the maximum number of context identifiers allocated to the transmitter device and the receiver device.

29. The transmitting device of claim 21, wherein to reassign the first context identifier to the new context, the at least one processor is further configured to execute the computer-executable instructions to:

select the first context identifier for reassignment based on the first context identifier being identified as least recently-used over a plurality of context identifiers assigned to the transmitter device and the receiver device.

30. The transmitting device of claim 21, wherein the replication context is a first replication context, and the at least one processor is further configured to execute the computer-executable instructions to:

disassociate, based on the reassigning of the first context identifier, a fourth context identifier associated with a second replication context from the first context identifier; and establish, with the receiver device, a third base context for fourth communications between the transmitter device and the receiver device, the fourth context identifier assigned to the second base context.

* * * * *